United States Patent [19]

Miller

[11] Patent Number: 5,265,221
[45] Date of Patent: Nov. 23, 1993

[54] ACCESS RESTRICTION FACILITY METHOD AND APPARATUS

[75] Inventor: Donald V. Miller, Los Altos, Calif.

[73] Assignee: Tandem Computers, Cupertino, Calif.

[21] Appl. No.: 985,234

[22] Filed: Dec. 2, 1992

Related U.S. Application Data

[63] Continuation of Ser. No. 325,745, Mar. 20, 1989, abandoned.

[51] Int. Cl.[5] ............................................. G06F 15/20
[52] U.S. Cl. .................................. 395/725; 235/382; 364/DIG. 1; 364/286.5
[58] Field of Search ........................ 235/382; 395/725; 364/DIG. 1, DIG. 2

[56] References Cited

U.S. PATENT DOCUMENTS

| | | | |
|---|---|---|---|
| 4,621,321 | 11/1986 | Boebert et al. | 364/200 |
| 4,701,840 | 10/1987 | Boebert et al. | 364/200 |
| 5,127,099 | 6/1992 | Zifferer et al. | 395/725 |
| 5,163,147 | 11/1992 | Orita | 395/725 X |
| 5,202,997 | 4/1993 | Arato | 395/725 |

OTHER PUBLICATIONS

1972; G. S. Graham and P. J. Denning; "Protection--Principles and Practice".
1976; P. P. Griffins and B. W. Wade; "An Authorization Mechanism for a Relational Database System".
1982; R. D. Graubart and J. P. L. Woodward; "A Preliminary Naval Surveillance DBMS Security Model".
Aug. 1984; C. E. Landwehr, C. L. Heitmyer and J. McLean; "A Security Model for Military Message Systems"; *AMC Transactions on Computer Systems*, vol. 2 No. 3, pp. 198-222.
Dec. 1985; U.S. Dep. of Defense; "Trusted Computer System Evaluation Criteria".
1986; "Handbook of EDP Auditing"; Ch. 32, pp. 532-01 through 532-66.
May 1986; National Computer Security Center; "Final Evaluation Report of Control Data Corporation Network Operating System Security Evaluation Package".
Aug. 1986; Datapro Research Corporation; "The Use of Access Control in a Computer System".
Sep. 1986; Datapro Research Corporation; "How to Select Host Access Control Software."
Sep. 9, 1986; National Computer Security Center; "Final Evaluation Report of Computer Associates, International CA-ACF 2/VM"; Release 3.1.

(List continued on next page.)

*Primary Examiner*—Edward R. Cosimano
*Attorney, Agent, or Firm*—David Newman & Associates

[57] ABSTRACT

An access control mechanism for granting, revoking, and denying authorization to computer system objects using a customer supplied set of verbs, parameters, attributes, and functions. The access control mechanism employs a processor for providing access controls to objects comprising subject memory, verb memory, object memory, definition memory, rule memory and an evaluator. The processor may be embodied as a microprocessor and memory, or a computer using software. The subject memory stores specified user attributes in a matrix having information for each user on each row, with user attributes in each field. The object memory stores object names, object attributes, and rules for defined verb names. The definition memory stores field definitions, external function declarations and strings. The rule memory stores rule names with their associated boolean expressions. The evaluator determines whether or not access to a specific object is allowed according to specified or default rules, user and object attributes, and definitions. While the term "Discretionary Access Control" is used throughout this document, the mechanism described herein can be used to implement discretionary, mandatory, and nonOdiscretionary (Clark-Wilson) security models.

36 Claims, 4 Drawing Sheets

OTHER PUBLICATIONS

Sep. 30, 1987; National Computer Security Center; "A Guide to Understanding Discretionary Access Control in Trusted Systems."

Jan. 1988; Datapro Research Corporation; "Computer Associates International, Inc. CA-ACF2".

Jan. 25, 1988; Jack Stoller; "Introduction to CA-ACF2".

Feb. 1988; Datapro Research Corporation; "Case Study: Implementing RACF at Puget Power."

Mar. 1988; DataPro Research Corporation; "CA-Top Secret."

Apr. 1988; Datapro Research Corporation; "All About Host Access Control Software."

Jun. 1988; T. F. Lunt; "Access Control Policies: Some Unanswered Questions."

Aug. 1988; T. L. Lunt; P. G. Neumann and D. Denning, R. Schell, M. Heckman and W. R. Shockley; "Secure Distributed Data Views."

Nov. 6, 1988; D. V. Miller and T. F. Lunt; "Enforcing Site-Specified Discretionary Policies in a General Purpose System."

1989; T. F. Lunt; "Access Control Policies for Database Systems."

Feb. 1, 1989; T. F. Lunt, D. Denning, R. Schell, M. Heckman and W. R. Shockley; "The Seaview Formal Security Policy Model."

P. Rougeau and E. D. Sturms; "The Sybase Secure Dataserver; A Solution to the multiple Secure DBMS Problem."

VERBS

| NAME | DEFAULT RULE |
|---|---|
| CREATE: | :{'C_RULE_'+{OBJ.VOL}} I SUBJ.LVL>5; |
| OPEN: | SUBJ.GRP=OBJ.CREATOR.GRP |
| R: | 0 |
| W: | 0 |
| E: | 0 |
| P: | 0 |
| ALTER: | 0 |
| HACK: | 0 |
| SING_ROCK: | SUBJ.COLOR='GRN' |
| PLAY_RUGBY: | SUBJ.COLOR='RED' I SUBJ.COLOR='BRN' |

*Fig. 4*

OBJECTS

| NAME | CREATOR | | RULES | |
|---|---|---|---|---|
| $S #MAIL | A | SW_DEV | NABER : | E: 0; |
| | | | | P: SUBJ.NAME~'NABER CROOK' |
| $VOLX DON | A | SECURITY | MILLER: | R: :WRK_HRS; |
| | | | | W: G&:WEEKDAY&TIME.MIN>39 |
| $VABC SUBV | B | SW_DEV | CROOK : | W: :W_OBJ_GROUP; |
| | | | | E: SUBJ.ROLE='PROGRAMMER' |
| $VXYZ FILE_1 | A | HW_DEV | WILSON: | R: :PROGRAMMERS; |
| | | | | W: SUBJ.NAME~ACL_1 |
| $VXYZ FILE_2 | A | HW_DEV | WILSON: | W: :MEMBER_OF_A |
| | | | | & SUBJ.NAME<>'NABER'; |
| MOVIES | | SYSTEM | : | E: DAY~WEEKEND I ~:WRK_HRS |
| BUSINESS LUNCH | | SYSTEM | : | E: :WEEKDAY&TEMP>74 |
| | | | | I SUBJ.ROLE='SALESMAN' |
| COFFEE_BREAK | | SYSTEM | : | E: :BREAK_TIME |
| | | | | I SUBJ.ROLE='PROGRAMMER' |

*Fig. 5*

Fig. 6 — DEFINITIONS

| NAME | VALUE |
|---|---|
| CREATOR: | [19,8] |
| SYSTEM: | [1,3] |
| GROUP: | [5,8] |
| NAME: | [14,6] |
| VOL: | [1,5] |
| LVL: | [21,3] |
| DATE: | EXTERN |
| TIME: | EXTERN |
| HOUR: | [1,2] |
| MIN: | [4,2] |
| TEMP: | EXTERN |
| DAY: | EXTERN |
| WEEKEND: | SAT SUN |
| ACL_1: | CHOU MILLER CROOK |
| ACL_2: | WILSON JULIAN |
| $VABC_CL: | HW_DEV SECURITY |
| HAIR: | [25,4] |
| DESC: | [30,8] |
| ROLE: | [47,10] |
| GROUPS: | [39,7] |
| OBJ_GRP: | [28,1] |

Fig. 7 — RULES

| NAME | VALUE | |
|---|---|---|
| SAMESYS: | SUBJ.SYSTEM=OBJ.CREATOR.SYSTEM | |
| SAMEGRP: | SUBJ.GROUP=OBJ.CREATOR.GROUP | |
| SAMENAM: | SUBJ.NAME=OBJ.CREATOR.NAME | |
| ANYBODY: | 1 | ! UNIVERSAL ACCESS |
| NOBODY: | 0 | |
| C: | :SAMEGRP | ! SAME GROUP |
| U: | :C & :SAMENAM | ! SAME USER |
| O: | :U & :SAMESYS | ! SAME USER & LOCAL |
| G: | :C & :SAMESYS | ! SAME GROUP & LOCAL |
| A: | :SAMESYS | ! LOCAL |
| WEEKDAY: | ~DAY^WEEKEND | ! EXTERNAL FNC CALL |
| GOODGUYS: | SUBJ.GROUP=='HW_DEV' | |
| C_RULE_$VOLX: | SUBJ.ROLE='PROGRAMMER' | ! CREATE RULE FOR VOLX |
| C_RULE_$VABC: | SUBJ.GROUP^VABC_CL | ! CREATE RULE FOR VABC |
| WRK_HRS: | TIME.HOUR>=8 & TIME.HOUR=<17 | |
| MEMBER_OF_A: | 'A'^SUBJ.GROUPS | |
| BREAK_TIME: | TIME.MIN>=28 & TIME.MIN=<40 | |
| PROGRAMMERS: | SUBJ.ROLE = 'PROGRAMMER' | |

ACCESS RESTRICTION FACILITY METHOD AND APPARATUS

This patent issued from a continuation patent application, of a patent application having Ser. No. 07/325,745, filing date of Mar. 20, 1989, and now abandoned. The benefit of the earlier filing date of the parent patent application is claimed pursuant to 35 U.S.C. §120.

BACKGROUND OF THE INVENTION

This invention relates to an access control mechanism, and more particularly to an access control mechanism for use with entities such as a database, which facilitates implementing an arbitrary access policy to the entities using access control lists, user groups, user attributes, user capability lists, user roles or any user supplied function.

DESCRIPTION OF THE PRIOR ART

In the early days of computers, function was the primary goal and security was virtually nonexistent. Physical security was perhaps present, but the single-user nature of early machines did not require security methods within the system itself.

With the advent of multi-user operating systems, however, the importance of segregating users and their information from each other was recognized as a desirable quality of a computer system.

Objects that are today felt to be necessary to protect are records, blocks, pages, segments, files, directories, directory trees, programs, and processes, as well as fields, processors, video displays, clocks, printers, communications, devices, etc. Additionally, users of today's systems would like to define verbs, e.g., commands within an application, to the same access control mechanism used to protect the aforementioned objects.

Despite increased recognition of the importance of the worth of information as a valuable commodity to both individuals as well as to corporations, and the development of formal security models such as the Bell-LaPadula and Biba models for multilevel systems, the development of a flexible access control mechanism, one which can bridge the semantic gap between the customer's security policy and the access control mechanism, has not been forthcominq.

Traditional discretionary security mechanisms for granting, revoking and denying access of a user to objects such as a database are usually based on either Access Control Lists (ACL's) as shown in FIG. 1B, or Capability lists (C-Lists) as shown in FIG. 1A. These mechanisms are cumbersome if one wishes to impose further restrictions based on time, day of week, location, program name, roles, arbitrary functions, etc. Additionally, these mechanisms tend to restrict one's thinking about access control policies to the abilities of the mechanisms.

In addition to the usual simple access control lists and capability lists, there are other dimensions to discretionary access control policies for controlling access to objects whose interpretations are ambiguous and which largely have been ignored in today's commercial systems. However, some of these dimensions, such as support for user groups and for specific denial of authorization, which are required at the higher evaluation classes of the Orange Book *Department of Defense Trusted Computer System Evaluation Criteria*, Dept. of Defense, National Computer Security Center, DoD 5200.28-STD, December, 1985, such as support for role-based access controls, are commonly required for military applications. Others, such as ownership policies, are commonly implemented, but in a seemingly haphazard way. The result is that it is apparently impossible for a single general-purpose system to satisfy the discretionary access control requirements of all, or even most, applications. Thus, up until now, vendors have been forced to make arbitrary choices during implementation of security systems, and the users of such systems have had to force their security policies into the framework of the vendor-supplied access control mechanisms.

While many of the foregoing issues were raised by T. F. Lunt, *Access Control Policies: Some Unanswered Questions*, Computer Science Laboratory, SRI International, Menlo Park, Calif., 1988, to date a generalized mechanism that can enforce arbitrary site-specified discretionary access control policies in a single general purpose system has not been presented.

OBJECTS AND SUMMARY OF THE INVENTION

An object of the present invention is to provide an access control mechanism method and apparatus for granting, revoking, and denying authorization to entities in a computer system to and from users and groups where entities may be either objects or verbs.

A further object of the invention is to provide an access control mechanism method and apparatus for granting, revoking, and denying authorization to entities on the basis of user roles.

A still further object of the invention is to provide an access control mechanism method and apparatus for granting, revoking, and denying authorization to any level of hierarchy of entities allowing easy implementation of separation of duties.

An additional object of the invention is to provide an access control mechanism method and apparatus for granting, revoking, and denying authorization to entities using customer-supplied attributes of users and objects, as well as customer-defined verbs.

According to the present invention, as embodied and broadly described herein, an access control mechanism using a processor is provided for specifying access control policies to entities, comprising subject means, verb means, object means, definition means, rule means and evaluation means. The processor may be embodied as a microprocessor and memory, or computer using software. The subject means stores user information in a matrix having information for each user on each row, and user attributes pertaining to the specific user in each field (column). The object means stores object names with object attributes and object rules expressed as object-boolean expressions for defined verb names. The definition means stores field definitions, external function declarations and strings. The verb means stores verb names with a default rule for each verb name. The rule means stores rule names with their associated rule-boolean expressions. The evaluation means is coupled to the subject means, verb means, definition means, object means and the rule means, and determines whether access to the entity is allowed.

The present invention also can be embodied as a method using a processor for providing access control to entities, with the processor having subject means, object means, definition means, verb means, rule means and evaluation means. The evaluation means is coupled to the subject means, verb means, definition means, object means and rule means. The evaluation means is coupled to the subject means, the object means, the definition means, the verb means, and the rule means. The processor may be embodied as a computer using software. The method comprises the steps, using the processor, of storing in subject means user attributes in a matrix having a specific user on each row, with user attributes pertaining to each user in each field, and storing in object means object names, object attributes and rules for defined verb names. The method further stores in definition means field definitions, external function declarations and strings, stores in verb means verb names with a default rule for each verb name, and stores in rule means rule names with their associated boolean expressions. The method additionally determines access authorization according to the results of the boolean expression as specified by a particular default rule associated with an entity, employing user and object attributes specified via the subject means, object means, and definition means, external functions specified via the definition means, and strings specified via the definition means.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 4 is an example of a verb window displaying verb names and default rules;

FIG. 5 is an example of an object window displaying object names, object attributes, and rules for defined verbs;

FIG. 6 is an example of a definition window displaying field definitions, external function declarations and strings; and, FIG. 7 is an example of a rule window displaying rule names and their associated boolean expressions.

DETAILED DESCRIPTION OF THE PREFERRED EMBODIMENTS

Figure 1A:
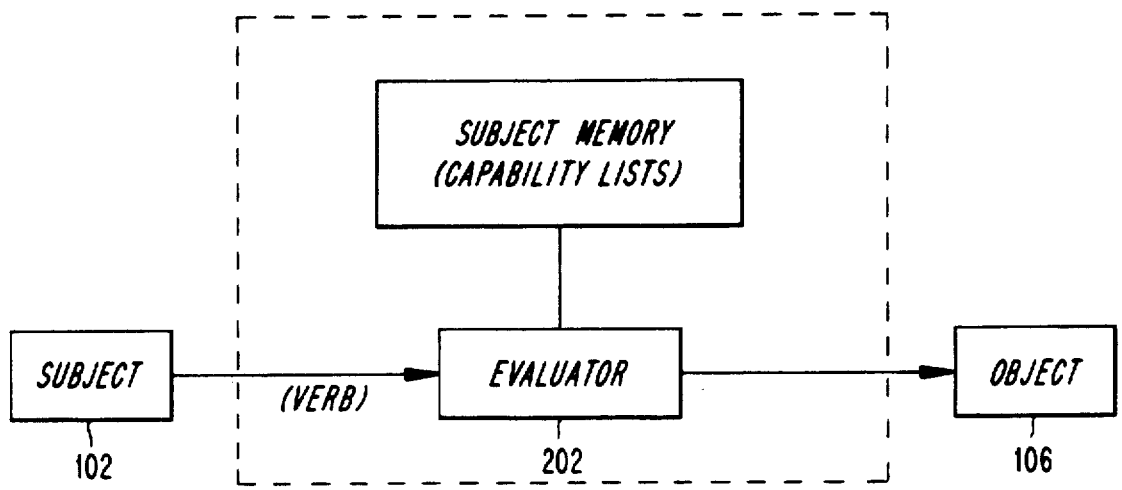
FIG. 1A is a block diagram of a discretionary access control mechanism employing an access control list.
Figure 1B:
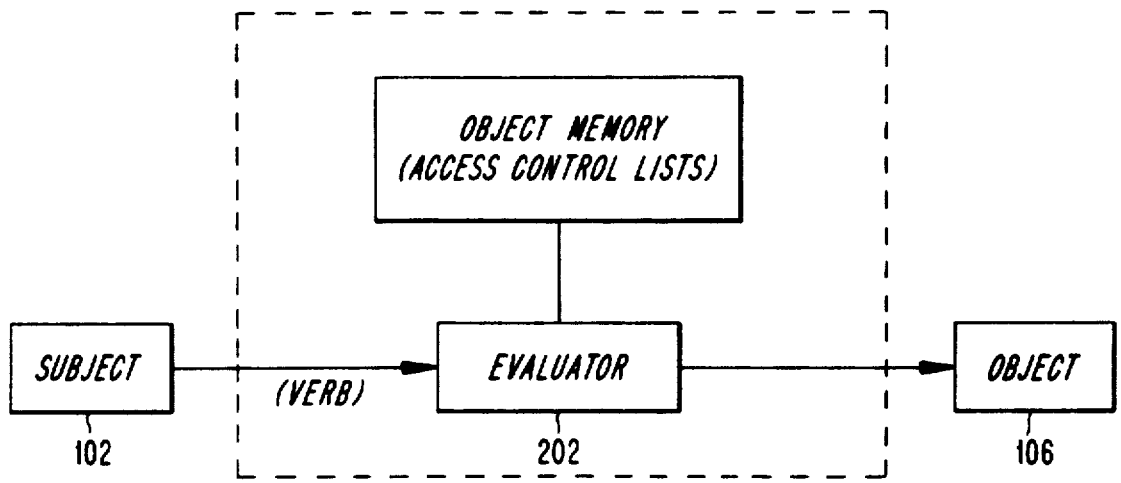
FIG. 1B is a block diagram of a discretionary access control mechanism employing a capabilities list.

Reference will now be made to the present preferred embodiments of the invention, examples of which are illustrated in the accompanying drawings wherein like reference numerals indicate like elements throughout the several views.

Figures 2, 3:
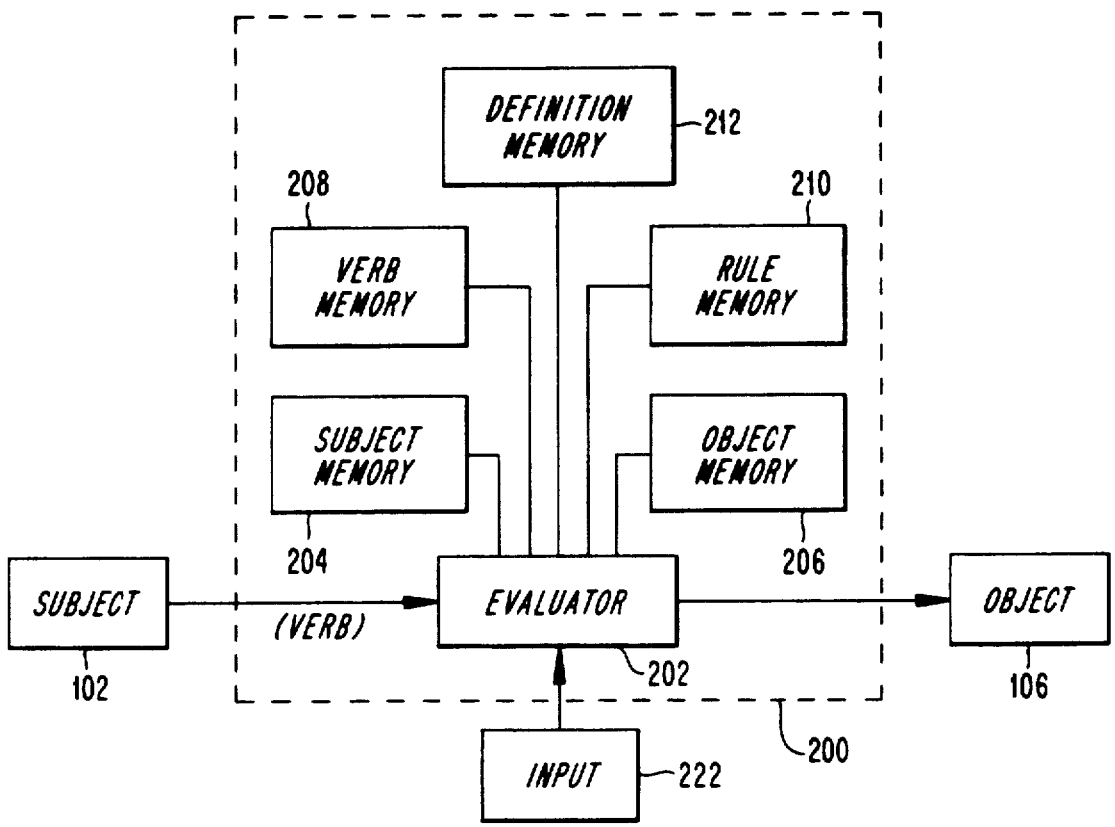
FIG. 2 is a block diagram of a general access control mechanism according to the present invention.
FIG. 3 is an example of a subject window displaying user names and attributes.

FIG. 2 illustratively shows an access control mechanism apparatus 200 which may be embodied in a processor comprising subject means, objection means, definition means, verb means, rule means, and evaluation means. The subject means may be embodied as a subject memory 204, the object means may be embodied as an object memory 206, the verb means may be embodied as a verb memory 208, the rule means may be embodied as the rule memory 210, and the definition means may be embodied as a definition memory 212. Further, the evaluation means may be embodied as evaluator 202. The access control mechanism apparatus 200, as shown in FIG. 2, coupled to the subject memory 204, the definition memory 212, the rule memory 210, the verb memory 208, and the object memory 206, mediates every access of entities by users, providing a YES or NO answer to the question: "Can this USER VERB this OBJECT?" The user requests access through input 222.

In the embodiment shown in FIG. 2, the subject memory 204 stores user information in a logical matrix having a specific user on each row, with user attributes, i.e. data pertaining to the specific user, in each field (column). The object memory 206 stores object names and object attributes and optionally object rules for defined verbs. The verb memory 208 stores verb names with a default rule for each verb name. The rule memory 210 stores rule names with their associated boolean expressions. The definition memory 212 stores field definitions, external function declarations, and strings. The evaluator 202, coupled to the subject memory 204, object memory 206, verb memory 208, the rule memory 210 and the definition memory 212, allows or disallows access of the user 102 to the entity 106 according to the specified verb, specified default rule, and user and object attributes.

The present invention alternatively may be embodied as a method using a processor for providing access control to entities, with the processor having subject means, object means, definition means, verb means, rule means and evaluation means. The evaluation means is coupled to the subject means, the verb means, the object means, the definition means, and the rule means. The method comprises the steps, using the processor, of storing in the subject means user information in a logical matrix having information for each user on each row, and user attributes in each field (column); storing in the object means object names with object attributes and object rules for verb names; storing in the definition means field definitions, external function declarations, and strings; storing in the verb means, verb names with a default rule for each verb name; storing in the rule means rule names with their associated boolean expressions; and determining, via the evaluator, coupled to the subject means, verb means, definition means, object means, and rule means, whether or not access to an entity is allowed.

To more fully understand the present invention, the following explanation of groups, rules and ownership is provided.

Groups

Security policies are concerned not only with which subject may obtain access to which objects, but also with the granting, revoking, and denying of authorizations to and from users and groups. Given the set of authorizations for users and groups, some rule must be applied for deriving authorization for subjects.

In the general case, a user may belong to more than one group. In assigning privileges to subjects acting on behalf of a user, one can choose to:

1. Have the subject operate with the union of privileges of all the groups to which the user belongs, as well as all his or her individual privileges;

2. Have the subject operate with the privilege of only one group at a time;

3. Allow the subject to choose whether to operate with its user's privileges or with the privileges of one of the groups to which its user belongs; and 4. Implement some other policy.

Note that even if a subject S is constrained to be associated with at most one group to which its associated user belongs, a user is still not constrained to operate with the authorizations of only one group at a time. For example, if user U belongs to a group G1 that is authorized for a relation or view R and U also belongs to another group G2 that has been specifically denied authorization for R, then U can still gain access to R by employing a subject whose associated group is G1, unless U has also been individually denied authorization for R. Thus, this choice of policy constrains subjects rather than users, and can be thought of as a form of least privilege.

Roles

Some applications may require that discretionary access controls be specified on the basis of user roles. Many systems have some built-in roles (e.g., system administrator, database administrator, system security officer). However, some applications require that arbitrary user job access control requirements be formalized in roles (for example, the secure military message system [3]) Thus, a generic capability for application-defined roles is desirable.

The relationship between a user's role authorizations and his or her user and group authorizations probably depends on the application. Whether a user acting in a certain role is to be prohibited from granting some of his or her role privileges to a user acting in another role is also probably application dependent.

Ownership

It is probably an application-dependent choice whether an object can have more than one owner. Ownership policies are sometimes implemented so that only the owner of an object has the right to delete or modify the object. However, in many commercial database systems, multiple users can have such authorizations for the same relation or view. Ownership could alternatively be interpreted as the right to grant and revoke authorizations for an object to and from other users. However, in any system that uses copyflags (such as Oracle) or that has access modes for grant and/or give-grant (as does SeaView [4, 5]), many users could have such authorizations. Although a special user, such as database administrator or security officer, may be able to grant and revoke authorizations that were not explicitly granted to him or her, that special user should not be able to revoke authorizations from the owner (although this may also be an application-dependent choice). A facility that allows an appropriate ownership policy for the organization to be defined at system installation would allow vendors to provide the comprehensiveness and flexibility of control to cover most applications, access control requirements while avoiding having to "wire in" a fixed ownership policy.

ISSUES ARISING IN DATABASE SYSTEMS

Propagation of Authorization

Several database systems, for example Oracle, use grantflags to control the propagation of authorizations. In Oracle, grantflags are specified for each user for a relation or view and access mode. The grantflag can have the value "grant" or "nogrant." The "grant flag allows a user to grant and revoke the corresponding access mode. In addition, a user with a "grant" flag for a relation or view R and mode m can give and rescind that grantflag.

In SeaView, the Propagation of access modes is controlled through the access modes "grant" and "give-grant" for R. If a user U is authorized the "grant" access mode for a relation or view R, then $U$ can grant or revoke any access mode other than "grant" and "give-grant" for R. A user U that is authorized the "give-grant" access mode for R can additionally grant and revoke the "grant" and "give-grant" access modes for R.

SeaView's inclusion of the give-grant mode enables a greater degree of control over the propagation of authorizations than Oracle's grantflag approach. In Oracle, if user A grants user B mode m for relation or view R with grantflag, then A cannot prevent B from granting the grantflag to other users. In SeaView, however, A could grant B the "grant" mode while withholding the "give-grant" mode.

There are other means, such as ownership policies, for controlling the propagation of authorizations. The choice, however, is likely to be application-specific.

Propagation of Revocations

In system R [6], when a user A revokes an access mode from another user B, the mode is also revoked from all users to whom B had granted the mode (which in turn starts several other chains of revocations). In SeaView, however, revocation is not propagated. If an ownership policy is in effect, propagation of revocation may be inappropriate. Whether to propagate revocation of authorization is probably an application-specific choice.

Authorizations for Views

In many relational database systems, a user may be authorized for a view without being authorized for the underlying relation(s). In such systems, granting authorization for a view but not for the underlying relation is a means of restricting authorization to a subset of the data contained in the relation.

SeaView does not require that a user be authorized for a relation in order to access a view defined on that relation. Instead, SeaView includes a reference mode that can be used to control which users and groups can gain access to stored data through views. In SeaView, a user can exercise access mode m for a view only if he or she is authorized for the reference mode on all referenced relations at the time the view is accessed. A user can withhold the ability to reference a relation through a view by not granting the reference mode.

The Sybase Secure Data server takes another alternative, in which users cannot obtain data through a view unless they have the corresponding authorizations for all the referenced relations. No authorization information is kept for views [7].

A consequence of the SeaView approach is that when a user creates a view, he or she becomes authorized for only those access modes for it for which the user is authorized for each underlying relation. The set of users and groups authorized for a view is modified as access modes are subsequently granted and revoked for that view, independently from the granting and revoking of modes for the underlying relation(s). As a result, if a user or group G is later granted additional authorizations for the underlying relations, G does not thereby gain the corresponding authorizations for the views defined on those relations. Another consequence is that view authorizations are not revoked when authorization for an underlying relation is revoked.

With the Sybase approach, view authorizations are computed from the authorizations for the underlying relations at the time the view is accessed. With this approach, if a user's authorization for an underlying relation is revoked, the user can no longer access the view.

Which of these approaches is desired is probably an application-dependent choice.

A GENERALIZED ACCESS CONTROL MECHANISM

Because so many alternative formulations of discretionary access control policies are possible, it is unnecessarily limiting to have to "wire in" a specific policy into a system. It is appealing to envision a system that could enforce any of a number of discretionary access control policies, where each installation would initiate the particular policy to be enforced. Such a system would, when initialized, ask for choices to be made among sets of options.

Discretionary access control mechanisms are in the most reduced sense binary decisions: a subject is either allowed or not allowed to perform some action on some object. This concept can be stated as follows: the sentence "Subject may Verb Object" is either true or false. A general discretionary access control mechanism, therefore, should have subjects, verbs, and objects as inputs to a boolean expression evaluator, as disclosed herein.

A Demonstration Program

A discretionary access control mechanism based on the evaluation of boolean expressions has been implemented in a demonstration program which runs in a window environment on a personal computer. This program, called ARF (Access Restriction Facility) consists of five windows: a user window, a verb window, an object window, a definition window, and a rule window, which correspond to the subject memory 202, verb memory 208, object memory 206, definition memory 212 and rule memory 210 of FIG. 2, respectively. Given a selected subject, verb, and object, the execution function corresponds to evaluator 202.

ARF can demonstrate generalized access control to objects such as files, processes, devices, tables, rows, columns, fields, commands, etc. Access can be allowed or denied on the basis of any user name, role, group location, hair color, temperature, phases of the moon—indeed anything that can be expressed as a character string.

ARF Windows

Below we illustrate the various ARF window types.

The User Window

The user window, shown in FIG. 3, is used to display and update user names and user attributes. Columns in this window can be used to specify the user's group(s), the role(s) or general attributes. The information displayed by the user window of FIG. 3 corresponds to the data stored in subject memory 204. The definition window is used to define fields in the record of this window.

In the example of FIG. 3, "LVL" can refer to a level of trust, for example. The number and names of fields appearing in the user window and the type of information they contain, other than the column which is always the user name, are configurable by the system security officer. No field in the user record has any intrinsic meaning. Fields have meaning only when coupled by the evaluator to information in other windows (memories). Hence, there can be any number of attributes associated with a particular user such as system, group, name, level, hair color, description, group membership, and role, as depicted in FIG. 3, but other attributes are possible such as name or program or process being executed, location, etc. In other words, the data appearing in the fields of the user records are not assumed to have any meaning; they are just strings.

ARF itself can be used to enforce strict separation of duties. Different individuals or groups could be authorized to insert or update information into the subject memory based on other ARF rules stored in the rule memory.

The Verb Window

The verb window, shown in FIG. 4, is used to display and update verb names and default rules. The information displayed by the window of FIG. 4 corresponds to the data stored in the verb memory 208. Default rules are used when a specific rule for a particular object does not exist. (Specific rules are defined and displayed using the rule windows. Everything after the verb name is considered to be a default rule to be used if there is no specific rule for the selected object. For the example shown in FIG. 4, default=0 denotes a closed system, and default=1 denotes an open system.

In an open system, a subject is authorized to perform operations on objects unless explicitly disallowed, whereas in a closed system a subject cannot perform operations on objects unless explicitly authorized. In the above example, the verbs READ, WRITE, EXECUTIVE, PURGE, ALTER, and GRANT are defined with a closed system rule, so that explicit authorization is required in order to use them.

For the first verb, CREATE, the colon symbol preceding the rule names indicates that the result. Here, the result of evaluating {'C_RULE_'+{OBJ.VOL}} will be a rule name for a rule defined in the rule window. The .VOL indicates that the field VOL, defined in the definition window, is to be extracted from the object string yielding the volume name for the object. The "+" is the concatenation operator, which is being used here to append this volume string to "C_RULE_". Thus, for object "$VXYZ FILE_1", for example, the expression {'C_RULE_'+OBJ.VOL'} evaluates to C_RULE_$VXYZ, which is a rule defined in the rule window. The vertical bar means "or". Thus, in the first entry in the verb window above, the default rule for CREATE is that either the rule C_RULE_$VXYZ is satisfied or the user's level is greater than 5.

The Object Window

The object window, shown in FIG. 5, is used to display and update object names and rules for defined verbs. The information displayed in the object window corresponds to the data stored in the object memory 206. In FIG. 5, information preceding the colon (:) is either the name of the object or an attribute of the object, the semantics being defined via the definition window. Everything after the object name is considered to be a rule list. Rules for specific verbs are designated as:

<verb_name>: <rule>

Object rules must be separated by semicolons (;).

In this window, rule names, defined in the rule window, are prefixed by a colon (:) and verb names, defined in the verb window, are suffixed by a colon (:). For example, one of the rules specified above for object "$VXYZ FILE_2" is:

W: :MEMBER_OF_A & SUBJ.NAME <>'NABER';

The verb W (WRITE) is defined in the verb window, and the rule MEMBER$_{13}$ OF$_{13}$ A is defined in the rule window. This means that the verb W can be invoked for object $VXYZ FILE$_{13}$ 2 only if the rule MEMBER$_{13}$ OF$_{13}$ A satisfied. The other part of the rule, "& SUBJ.NAME <>'NABER'", means that even if the rule MEMBER$_{13}$ OF$_{13}$ A is satisfied, write access by NABER is specifically denied. The write rule for object "$VXYZ FILE$_{13}$ 1" indicates that the user must be on the access control list ACL$_{13}$ 1, as specified in in the definition window.

The Definition Window

The definition window, shown in FIG. 6, is used to display and update field definitions, external function declarations, and strings. The information displayed in the definition window corresponds to the data stored in the definition memory 212 of FIG. 2. Definitions are character strings, which may be one of the following:

Substring Designator

<DefName>: [<StartPos>,<NumChars>]

External Function

<DefName>: EXTERN

For external functions, the caller must provide a function called "Std$_{13}$ Fcn" with a string argument of <name> which returns a general character string.

Lists

<DefName>: <List>

In the example of FIG. 6, the definition "VOL [1, 5]", when applied to a string, extracts the first five characters of the string (starting at character 1, for five characters). Thus, when applied to an object name in the examples shown in the object window, .VOL extracts the volume name for the object. For example, the volume name for the object "$VXYZ FILE$_{13}$ 2" is $VXYZ.

In the example of FIG. 6, DATE, TIME, TEMP, and DAY are external functions.

The list ACL_1, ACL$_{13}$ 2, and $VXYZ$_{13}$ CL are used to define groups or access control lists.

The Rule Window

The rule window, shown in FIG. 7, is used to display and update boolean expressions to be used by the expression evaluator. The information displayed in the rule window corresponds to the data stored in rule memory 210. Rules defined in the rule window override the default rules defined in the verb window. Everything after an exclamation mark (!) in a rule is considered to be a comment.

Rules are boolean expressions which must yield a true or false result (stored internally as "1"/"0"). Rules may reference other rules either:

Directly
:<RuleName>
or
Indirectly
:{<SomeString>}

The following are examples of using the present invention to express various access control policies.

1. Access Control Lists

Access control lists can be expressed using ARF's object window as follows:

W: USER.NAME_ 'USER_A USER_B USER_D'

This means that the intersection of the set X comprising USER_A, USER_B, USER_D, has write authorization for the object.

2. Named Access Control Lists

Named access control lists can be specified using ARF's object window as follows:

W: USER.NAME ACL_x where ACL$_{13}$ 1 is defined as follows (using the definition window):

ACL_1:_ 'USER_A USER_B USER_D'

3. Exclusionary Access Control Lists

Exclusionary access control lists can be expressed using ARF's object window as follows:

W: USER.NAME_LIST1 | USER.DEPT_LIST1

This means that the users whose user names and departments are specified in LIST1 are explicitly denied write authorization for the object.

4. Capability Lists

Capability lists can be specified using ARF's user window by defining one of the user attributes (fields) in that window to be a list of objects for which the user has authorization. Below, we call this list "_ W_ LIST".

The following rule would appear in the object window for an object:

W: OBJ.NAME USER.$_{13}$ W$_{13}$ LIST where, for example, for USER_A, _ W_ LIST could be defined as follows:

OBJ_ X OBJ_ Y OBJ_ Z

5. Access by Time

WRITE: 8 <=HOUR & HOUR <=17 where HOUR is defined in the definition window to be EXTERN or it is an intrinsic function:

6. Rule

W: :WORK_HOURS where WORK_HOURS is defined in the definition window to be:

WORK₁₃ HOURS: 8 <=HOUR & HOUR <=17

Other Issues Arising from Orange Book Requirements

In the higher evaluation classes of the Criteria [1], users are able to specify which users and groups are authorized for specific modes of access to named objects, as well as which users and groups are specifically denied authorization for particular named objects. Note that specific denial of authorization is not the same as simple lack of authorization. For example, the set of users and groups authorized for an object might be implemented as an ACL (access control list) and the set of users and groups specifically denied authorization as an XACL (exclusionary access control lists), as in the naval surveillance model [8]. Because the set of users and groups authorized for an object may be independent of the set of users and groups denied authorization, there may be apparent conflicts between the two sets. For example, consider the following ACL and XACL for a relation R:

ACL: U1, U2, G1, G2
XACL: U1, G2, U3, G3

Now consider the following questions:
Is U1 authorized for R?
If U2 is in G3, is U2 authorized for R?
If U1 is in G1, is U1 authorized for R?
If U1 is in G1 and U1 is in G2, is U1 authorized for R?
If U3 is in G1, U3 is not in G2, and U3 is not in G3, is U3 authorized for R?

The answers to questions such as these are not provided by the criteria.

Specific choices have been made by particular systems designed for these evaluation classes; however, such choices are arbitrary and may not be suitable for all applications. Lunt [2, 9] goes into detail about a number of specific alternative approaches to these questions. However, it is probable that choices about the meaning of denial and about how to reconcile the authorizations granted to users individually and as members of groups are application-dependent. Thus, such choices could be specified at system-installation time using a mechanism like ARF.

Administration

Since administration of a set of subject and users in a computer system becomes more difficult as the number of subjects and objects increases, a goal of an access control mechanism should be to minimize the amount of work required by security administration personnel. This can be accomplished in several ways with ARF. One of the ways has already been described—defining a few rules which describe the security policy of a computer system and basing access authorization on this small set of rules. The effort required to administration can also be minimized and the security of the system can be increased by using ARF to enforce the concept of separation of duties among several sets of security administration personnel. This concept is demonstrated in the following:

Subject Administration

Using ARF, a hierarchy of administration can exist for subjects. Certain sets of users can be responsible for adding, deleting, altering subjects of a specified set. example:

Suppose the following two files exist:

$SYSTEM.ARFADMIN.RULES

| SWDEV.* : USER.ROLE = 'SWDEV_SEC' |
| FINANCE.* : USER.ROLE = 'FINANCE_SEC' |

R: USER.ROLE = 'SECURITY_ADMIN'| PROGRAM_NAME = $SYSTEM.ARF.ADMIN;
W: USER.ROLE = 'SECURITY_ADMIN';
P: NOBODY

This file specifies who can change which user records and can only be altered by SECURITY₁₃ ADMIN personnel.

$SYSTEM.SYSTEM.USERID

| user-name | user attributes, etc. |
|---|---|
| SWDEV.JOHN | \ administered by SWDEV_SEC |
| SWDEV.MARY | / |
| FINANCE.ALICE | \ administered by FINANCE_SEC |
| FINANCE.BOB | / |

W: PROGRAM_NAME = '$SYSTEM.ARF.ADMIN';

P: NOBODY;

The ARF administration program, $SYSTEM.ARF.ADMIN, uses the rules in $SYSTEM.ARFADMIN.RULES to determine who can change which user records in $SYSTEM.SYSTEM.USERID, thus providing a clear separation of duties between SWDEV security personnel and FINANCE security personnel. The entries in $SYSTEM.SYSTEM.USERID will then be used to enforce access restriction to the system and entities within the system as described previously.

Object Administration

Given that objects are protected via ARF, whose decisions are based on a set of subject and object attributes, a set of rules, and a set of definitions, administration is made considerably easier if a hierarchy of rules is implemented and enforced, i.e. a security administrator should be able to say "All disk objects on volume $A adhere to Rule₁₃A. All disk objects on $A.X adhere to Rule₁₃ A₁₃ X, etc. Therefore, specific rules need not be applied to each specific object and the rules can be changed without altering the objects affected by the Rules.

Control over who can change the rules is also enforced via ARF.

There is a set of Rules specifying Rule-Name and the Rule for altering specified Rules. example:

Suppose the following two files exist:

$SYSTEM.ARFADMIN.RULES

```
$FINANCE.ACCTPAY.*: USER.ROLE = 'ACCTS_PAY_SECURITY'
$FINANCE.ACCTRCV.*: USER.ROLE = 'ACCTS_RCV_SECURITY'
```

R: USER.ROLE = 'SECURITY_ADMIN'| PROGRAM_NAME = $SYSTEM.ARF.ADMIN;
W: USER.ROLE = 'SECURITY_ADMIN';
P: NOBODY;

This file specifies who can change which rules and can only be altered by SECURITY$_{13}$ ADMIN personnel.

$SYSTEM.ARF.RULES

```
$FINANCE.ACCTPAY.*: R: 'ACCTS_PAY'   USER.GROUPS;
$FINANCE.ACCTRCV.*: R: 'ACCTS_RCV'   USER.GROUPS;
```

R: ANYBODY;
W: PROGRAM_NAME = '$SYSTEM.ARF.ADMIN';
P: NOBODY;

This file specifies who can access which files and can only be altered by someone running the program $SYSTEM.ARF.ADMIN.

The ARF administration program, $SYSTEM.ARF.ADMIN, uses the rules in $SYSTEM.ARFADMIN.RULES to allow/disallow changes to the rules in 4SYSTEM.ARF.RULES. There rules in $SYSTEM.ARF.RULES are the rules used by the reference monitors for the authorization checks when users try to access objects.

As set up access rules, only users whose role is Accounts Receivable Security can alter the rules for files in subvolume $FINANCE.ACCTPAY and only users whose role is Accounts Payable Security can alter the rules for files for the subvolume $FINFNACE.ACCTRCV.

For accessing the files, users in group ACCTS$_{13}$ PAY can read files in subvolume $FINANACE.ACCTPAY while members of the group ACCTS$_{13}$ RCV can read files in subvolume $FINANCE.ACCTRCV. Note that this may or may not include the people who specified the access rules. Only a user whose role is 'SECURITY$_{13}$ ADMIN' can alter the rules contained in $SYSTEM.ARFADMIN, and the object authorization rules in $SYSTEM.ARF.RULES can only be altered by running the program $SYSTEM.ARF.ADMIN. This allow a clear separation of security administration duties, but ultimate security responsibility does rest on those users whose ROLE='SECURITY$_{13}$ ADMIN'. They're the ones who set the rules.

It will be apparent to those skilled in the art that various modifications can be made to the access control mechanism of the instant invention without departing from the spirit or scope of the invention, and it is intended that the present invention cover modifications and variations of the access restriction facility provided they come within the scope of the appended claims and their equivalents.

REFERENCES

[1] Department of Defense Trusted Computer System Evaluation %w Criteria. Dept. of Defense, National Computer Security Center, DOD 5200.28-STD, December 1985.

[2] T. F. Lunt. Access Control Policies: Some Unanswered Questions, Computer Science Laboratory, SRI International, Menlo Park, Calif., 1988.

[3] C. E. Landwehr, C. L. Heitmeyer, and J. McLean. 'A Security Model for Military Mesage Systems'. ACM Transactions on Computer Systems, August, 1984.

[4] D. E. Denning, T. F. Lunt, P. G. Neumann, R. R. Schell, M. Heckman and W. R. Shockley. Security Policy and Interpretation for a Class A1 Multilevel Secure Relational Database System. Computer Science Laboratory, SRI International, Menlo Park, Calif., 1986.

[5] D. E. Denning, T. F. Lunt, R. R. Schell, M. Heckman and W. R. Shockley. The SeaView Formal Security Policy Model, Computer Science Laboratory, SRI International, Menlo Park, Calif., 1987.

[6] P. P. Griffiths and B. W. Wade. 'An Authorization Mechanism for a Relational Database System'. ACM Trans. on Database Syst., Vol. 1, No. 3, pages 242-255, September 1976.

[7] P. A. Rougeau and E. D. Sturms. 'The Sybase Secure Dataserver: A Solution to the Multilevel Secure DBMS Problem'. Proceedings of the 10th National Computer Security Conference, September 1987.

[8] R. D. Graubart and J. P. L. Woodward. 'A Preliminary Naval Surveillance DBMS Security Model'. Proc. 1982 Symp. on Security and Privacy, pages 21-37, April 1982. [9] T. F. Lunt. 'Access Control Policies for Database Systems'. Proceedings of the IFIP WG 11.3 Workshop on Database Security, Kingston, Ontario, October, 1988, forthcoming.

I claim:

1. An access restriction mechanism using a processor for controlling access to objects in a computer system, comprising:

subject means for storing user information in a matrix having a specific user on each row of the matrix, with user attributes pertaining to each of the specific users in each field of the matrix;

verb means for storing at least one verb name with a default rule for each of the verb names;

object means for storing at least one object name with object attributes and object rules expressed as object-boolean expressions for each of the verb names;

definition means for storing field definitions, external function declarations and strings;

rule means for storing at least one rule name with a rule-boolean expression for each of the rule names; and evaluation means coupled to said subject means, said object means, said definition means, said verb means and said rule means, responsive to the user information, at least one verb name, at least one object name, at least one rule name and at least one of the field definitions, external function declarations and strings for determining, changing, and controlling access authorization, wherein access is granted or denied according to a predetermined algorithm including a combination of at least any two of default rules, object rules, field definitions, external function declarations, strings, rule-boolean expressions, user attributes, and object attributes.

2. The access control mechanism as set forth in claim 1, wherein said access restriction mechanism includes a computer using software.

3. The access control mechanism as set forth in claim 1, wherein said access restriction mechanism includes a microprocessor having memory.

4. The access control mechanism as set forth in claim 1, further comprising:
display means for displaying in a window format the contents of said subject means, said verb means, said object means, said definition means, said rule means, and said evaluation means for viewing by a user.

5. The access control mechanism as set forth in claim 4, further comprising input means coupled to said evaluation means for inputting data and instructions to the predetermined algorithm.

6. An access restriction mechanism for controlling access to objects in a computer system, comprising:
subject means for storing user information in a matrix having a specific user on each row of the matrix, with user attributes pertaining to each of the specific users in each field of the matrix;
verb means for storing at least one verb name with a default rule for each of the verb names;
object means for storing at least one object name with object attributes and object rules for each of the verb names;
rule means for storing at least one rule name with a rule-boolean expression for each of the rule names; and
evaluation means coupled to said subject means, said object means, said verb means and said rule means, responsive to the user information, at least one verb name, at least one object name and at least one rule name for determining access authorization, wherein access is granted or denied according to a predetermined algorithm including a combination of at least any two of default rules, object rules, rule-boolean expressions, user attributes, or object attributes.

7. The access control mechanism as set forth in claim 6, wherein said access restriction mechanism includes a computer using software.

8. The access control mechanism as set forth in claim 6, wherein said access restriction mechanism includes a microprocessor having memory.

9. The access control mechanism as set forth in claim 6, further comprising:
display means for displaying in a window format the contents of said subject means, said verb means, said object means, said rule means, and said evaluation means for viewing by a user.

10. An access restriction mechanism for controlling access to objects in a computer system, said access restriction mechanism comprising:
subject means for storing user information in a matrix having a specific user on each row of the matrix, with user attributes pertaining to each of the specific users in each field of the matrix;
object means for storing at least one object name with object attributes;
rule means for storing at least one rule name with a rule-boolean expression for each of the rule names; and
evaluation means coupled to said subject means, said object means, and said rule means, responsive to user information, at least one object name, and at least one rule name for determining access authorization, wherein access is granted or denied according to a predetermined algorithm including a combination of at least any two of rule-boolean expressions, user attributes, and object attributes.

11. The access control mechanism as set forth in claim 10, wherein said access restriction mechanism includes a computer using software.

12. The access control mechanism as set forth in claim 10, wherein said access restriction mechanism includes a microprocessor having memory.

13. The access control mechanism as set forth in claim 10, further comprising:
display means for displaying in a window format the contents of said subject means, said object means, said rule means, and said evaluation means for viewing by a user.

14. The method as set forth in claim 10, further including the step of changing access authorization by said evaluation means according to a second predetermined algorithm.

15. The method as set forth in claim 14, further including the step of controlling access to objects according to a second predetermined algorithm.

16. A method using a processor for controlling access to objects in a computer system, said processor having subject means, objects means, definition means, verb means, rule means and evaluation means with said evaluation means coupled to said subject means, said object means, said definition means, said verb means, and said rule means, comprising the steps, using said processor, of:
storing in said subject means user information in a matrix having a specific user on each row of the matrix, with user attributes pertaining to the specific user in each field of the matrix;
storing in said verb means at least one verb name with a default rule for each of the at least one verb names;
storing in said object means at least one object name wtih object attributes and object rules for each of the verb names;
storing in said definition means field definitions, external function declarations and strings;
storing in said rule means at least one rule name with a rule-boolean expression for each of the rule names; and
determining, in response to user information, at least one verb name, at least one object name, and at least one rule name, and any one of field definitions, external function declarations and strings, access authorization by said evaluation means, wherein access is granted or denied according to a predetermined computer algorithm including a combination f at least two of default rules, object rules, field definitions, external function declarations, strings, rule-boolean expressions, user attributes, and object attributes.

17. The method as set forth in claim 16 further including the step of changing access authorization by said evaluation means according to a second predetermined computer algorithm.

18. The method as set forth in claim 16, further including the step of controlling access to objects by said evaluation means according to a second predetermined computer algorithm.

19. The method using a processor as set forth in claim 16, further including the step of:
displaying in a window format the contents of said subject means, said verb means, said object means, said definition means, said rule means, and said evaluation means for viewing by a user.

20. The method using a processor as set forth in claim 19, further including the step of inputting data and instructions to the predetermined algorithm.

21. A method using an access restriction mechanism for controlling access to objects in a computer system, said access restriction mechanism having subject means, objects means, verb means, rule means and evaluation means with said evaluation means coupled to said subject means, said object means, said verb means, and said rule means, comprising the steps, using said access restriction mechanism, of:
storing in said subject means user information in a matrix having a specific user on each row of the matrix, with user attributes pertaining to the specific user in each field of the matrix;
storing in said verb means at least one verb name with a default rule for each of the verb names;
storing in said object means at least one object name with object attributes and object rules for each of the verb names;
storing in said rule means at least one rule name with a rule-boolean expression for each of the rule names;
determining, in response to user information, at least one verb name, at least one object name, and at least one rule name, access authorization by said evaluation means, wherein access is granted or denied according to a predetermined computer algorithm including a combination of at least any two of default rules, object rules, rule-boolean expressions, user attributes, and object attributes.

22. The method using a processor as set forth in claim 21, further including the step of:
displaying in a window format the contents of said subject means, said verb means, said object means, said rule means, and said evaluation means for viewing by a user.

23. The method as set forth in claim 21, further including the step of changing access authorization by said evaluation means according to a second predetermined computer algorithm.

24. The method as set forth in claim 21, further including the step of controlling access to objects by said evaluation means according to a second predetermined computer algorithm.

25. A method using an access restriction mechanism for controlling access to objects in a computer system, said access restriction mechanism having subject means, definition means, verb means, rule means and evaluation means with said evaluation means coupled to said subject means, said definition means, said verb means, and said rule means, comprising the steps, using said access restriction mechanism, of:
storing in said subject means user information in a matrix having a specific user on each row of the matrix, with user attributes pertaining to the specific user in each field of the matrix;
storing in said verb means at least one verb name with a default rule for each of the verb names;
storing in said definition means field definitions, external function declarations and strings;
storing in said rule means at least one rule name with a rule-boolean expression for each of the rule names;
determining, in response to user information, at least one verb name, at least one rule, and at least one of filed definitions, external function declarations and strings, access authorization by said evaluation means, wherein access is granted or denied according to a predetermined computer algorithm including a combination of at least any two of default rules, field definitions, external function declarations, strings, rule-boolean expressions, and user attributes.

26. The method using a processor as set forth in claim 25, further including the step of:
displaying in a window format the contents of said subject means, said object means, said rule means, and said evaluation means for viewing by a user.

27. The method as set forth in claim 25, further including the step of changing access authorization by said evaluation means according to a second predetermined computer algorithm.

28. The method as set forth in claim 25, further including the step of controlling access to objects by said evaluation means according to a second predetermined computer algorithm.

29. A method using an access restriction facility for controlling access to objects, in a computer system comprising the steps, using said access restriction facility, of:
storing user information in a matrix having a specific user on each row of the matrix, with user attributes pertaining to the specific user in each field of the matrix;
storing at least one verb name with a default rule for each of the verb names;
storing at least one object name with object attributes and object rules for each of the verb names;
storing at least one rule name with a rule-boolean expression for each of the rule names; and
determining, in response to user information, at least one verb name, at least one object name, and at least one rule names, and any one of filed definitions, external function declarations and strings, access authorization wherein access us granted or denied according to a predetermined algorithm including a combination of at least any two of the default rules, object rules, field definitions, external function declarations, strings, rule-boolean expressions, user attributes, and object attributes.

30. The method using a processor as set forth in claim 29, further including the step of inputting data and instructions to the predetermined algorithm.

31. The method as set forth in claim 29, further including the step of changing access authorization according to a second predetermined algorithm.

32. The method as set forth in claim 29, further including the step of controlling access to objects according to a second predetermined algorithm.

33. A method using an access restriction facility for controlling access to objects, in a computer system comprising the steps, using said access restriction facility, of:
   storing user information in a matrix having a specific user on each row of the matrix, with user attributes pertaining to the specific user in each field of the matrix;
   storing at least one verb name with a default rule for each of the verb names;
   storing at least one object name with object attributes and object rules for each of the verb names;
   storing at least one rule name with a rule-boolean expression for each of the rule names; and
   determining, in response to user information, at least one verb name, at least one object name, and at least one rule name, access authorization, wherein access is granted or denied according to a predetermined algorithm including a combination of at least any two of the default rules, object rules, rule-boolean expressions, user attributes, and object attributes.

34. A method using an access restriction facility for controlling access to objects in a computer system, comprising the steps, using said access restriction facility, of:
   storing user information in a matrix having a specific user on each row of the matrix, with user attributes pertaining to the specific user in each field of the matrix;
   storing at least one verb name with a default rule for each of the verb names;
   storing field definitions, external function declarations and strings;
   storing at least one rule name with a rule-boolean expression for each of the rule names; and
   determining, in response to user information, at least one verb name, at least one rule, and at least one of filed definitions, external function declarations and strings, access authorization, wherein access is granted or denied according to a predetermined algorithm including a combination of at least any two of the default rules, field definitions, external function declarations, strings, rule-boolean expressions, and user attributes.

35. The method as set forth in claim 34, further including the step of changing access authorization according to a second predetermined algorithm.

36. The method as set forth in claim 34, further including the step of controlling access to objects according to a second predetermined algorithm.

* * * * *